United States Patent [19]

Baudler

[11] 3,952,604
[45] Apr. 27, 1976

[54] DEVICE FOR CONVERTING LINEAR MOTION TO ROTARY MOTION

[76] Inventor: James P. Baudler, 6306 N. Louise Ave., Chicago, Ill. 60646

[22] Filed: July 15, 1974

[21] Appl. No.: 488,519

[52] U.S. Cl. .................................................. 74/57
[51] Int. Cl.² ........................................ F16H 25/12
[58] Field of Search ............... 74/57, 51; 123/197 C, 123/197 AC, 56

[56] References Cited
UNITED STATES PATENTS

| | | | |
|---|---|---|---|
| 602,356 | 4/1898 | Parker | 74/56 |
| 1,316,558 | 9/1919 | Cannon | 74/51 |
| 1,713,343 | 5/1929 | Leahy | 74/57 |
| 2,084,321 | 6/1937 | Corradino et al. | 74/57 |
| 2,757,547 | 8/1956 | Julin | 123/197 AC |
| 3,233,473 | 2/1966 | Winter | 74/57 |

*Primary Examiner*—Samuel Scott
*Assistant Examiner*—Wesley S. Ratliff, Jr.
*Attorney, Agent, or Firm*—Lockwood, Dewey, Zickert & Alex

[57] ABSTRACT

The motion converting device includes a double-threaded power shaft having two right-hand channels, two left-hand channels, and which is driven by a piston connected thereto. A power gear positioned in the path of movement of the rod has a central bore through which the shaft is received. The power gear is mounted in a guide block which holds the gear against movement axially of the shaft and which permits the gear to rotate. The guide block also has a bore through which the shaft extends. A spline connection operatively connects the shaft to the gear and permits the shaft to move axially of the power gear. First and second directional sleeves are mounted in the guide block at positions spaced axially from the power gear and are adapted to receive the rod therethrough. Each of the directional sleeves has at least one cam therein adapted to engage in one of the channels. The guide block holds the sleeves against axial movement while permitting them to rotate. The motion converting device also includes a locking mechanism which can take several forms and which is adapted to automatically and alternately lock one of the sleeves against rotation during linear movement of the connecting shaft on a power stroke or a return stroke of the piston so that the power gear will be driven in one direction during the power stroke and so that continued rotation of the power gear in one direction at the end of the power stroke will drive the connecting rod in the opposite direction for the return stroke of the piston. The locking mechanism is also adapted to disengage both sleeves to neutralize reciprocating motion.

12 Claims, 18 Drawing Figures

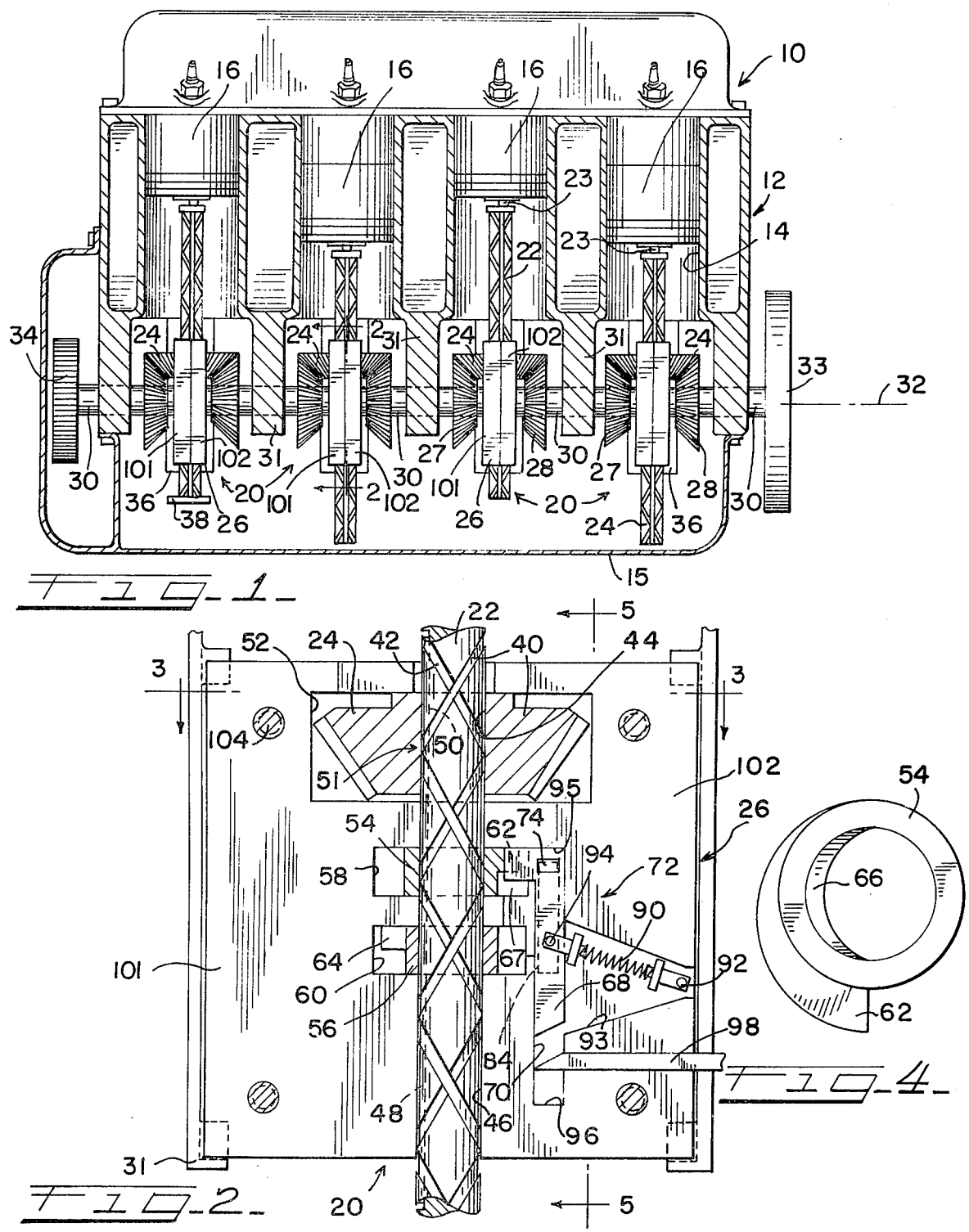

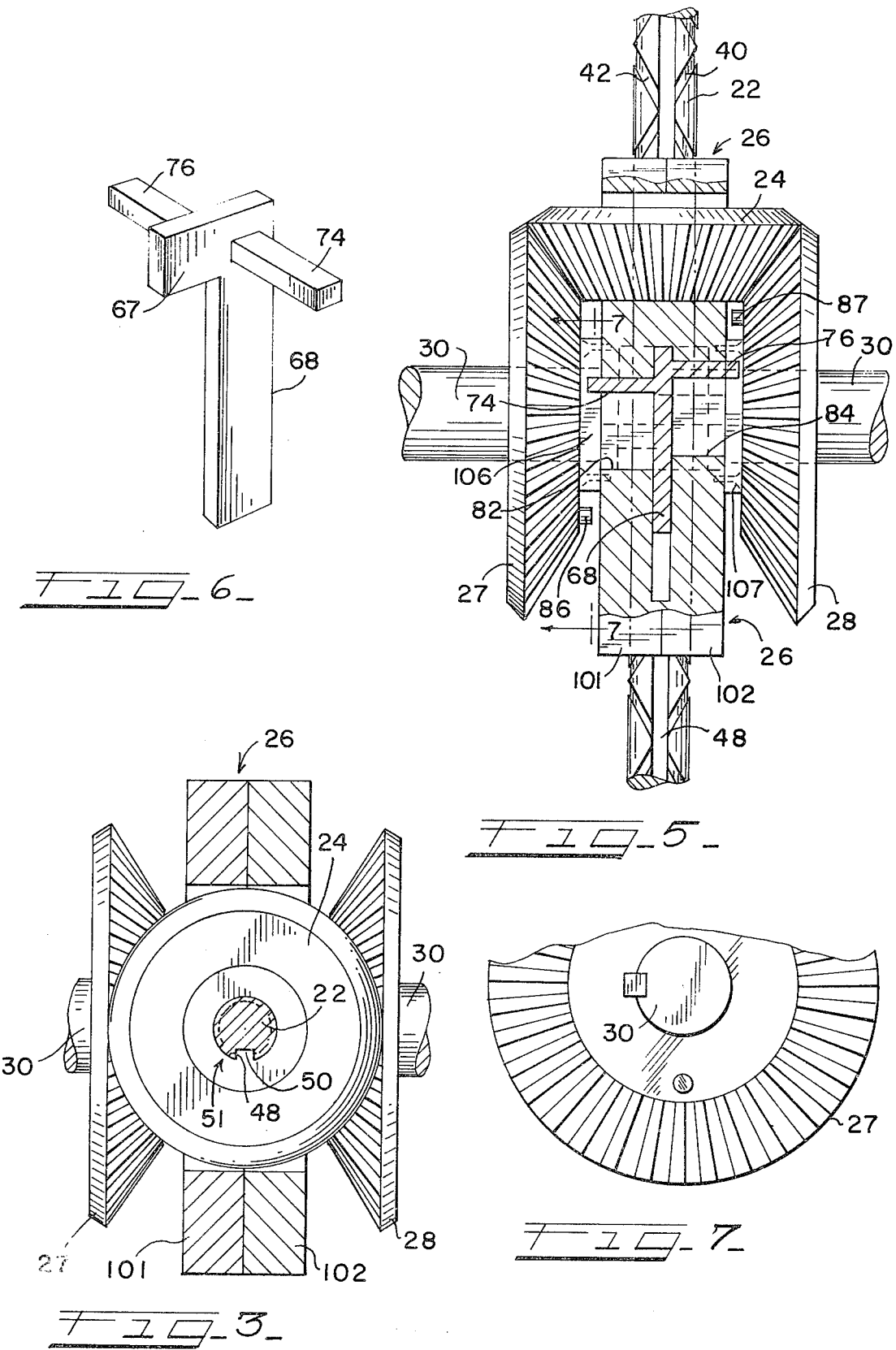

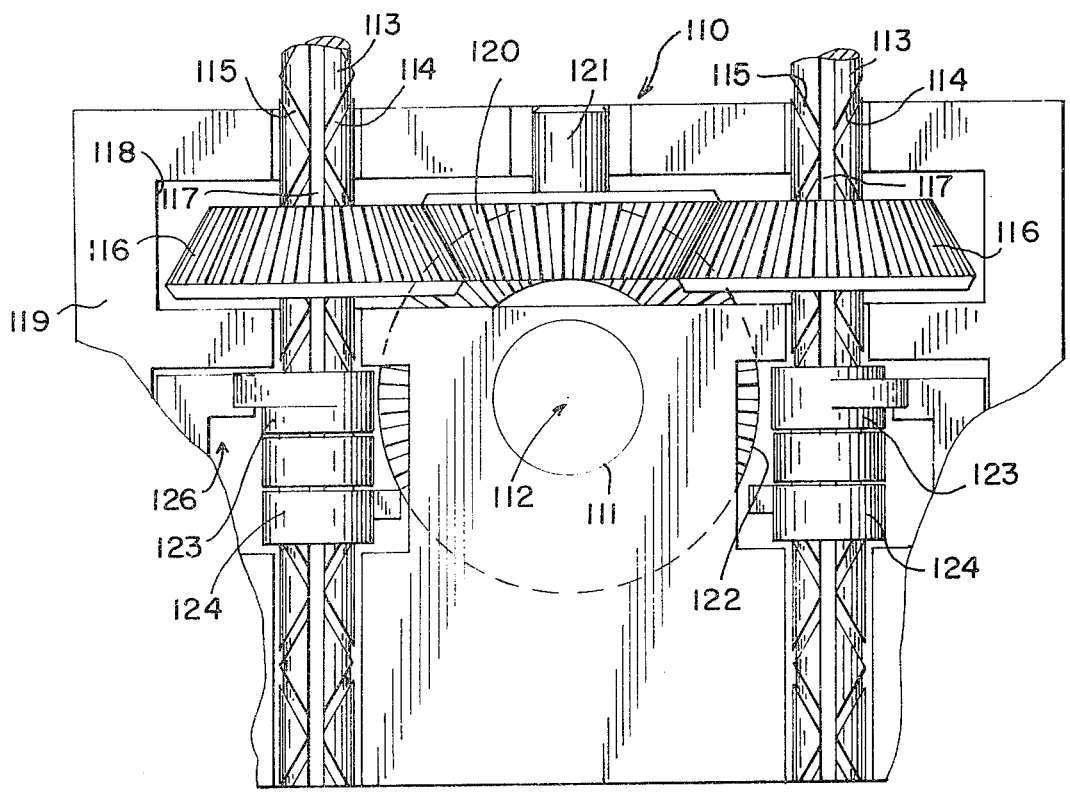
Fig. 8
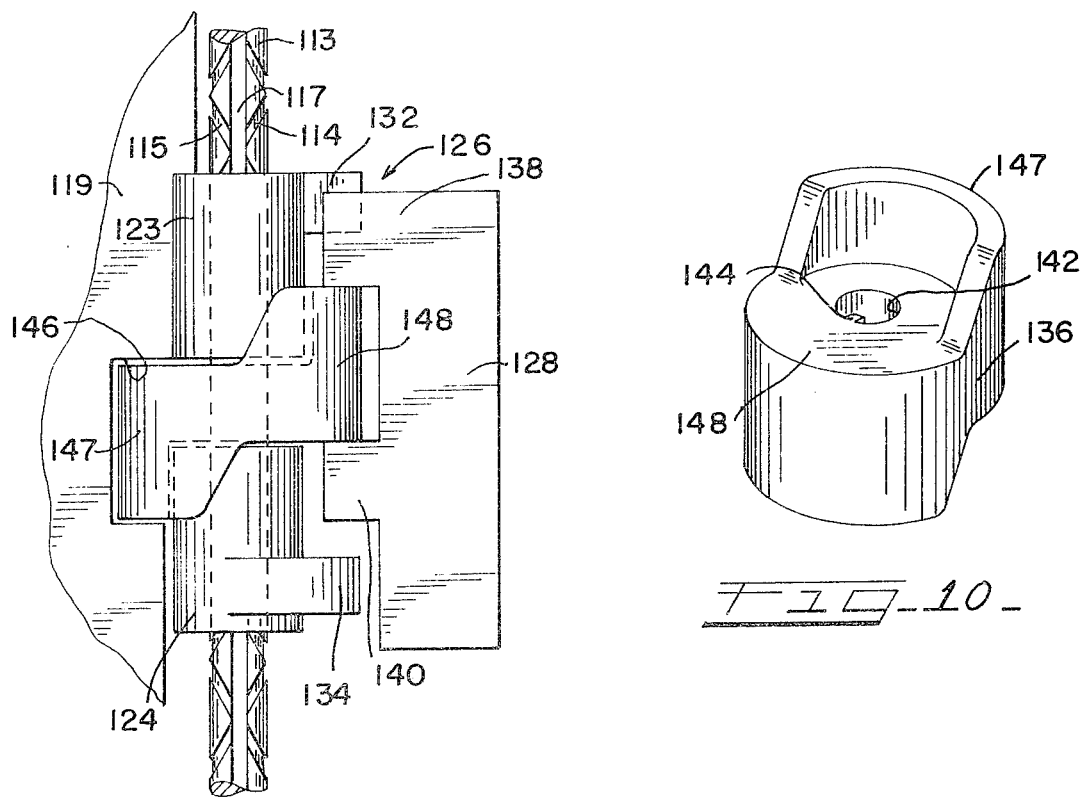
Fig. 9
Fig. 10

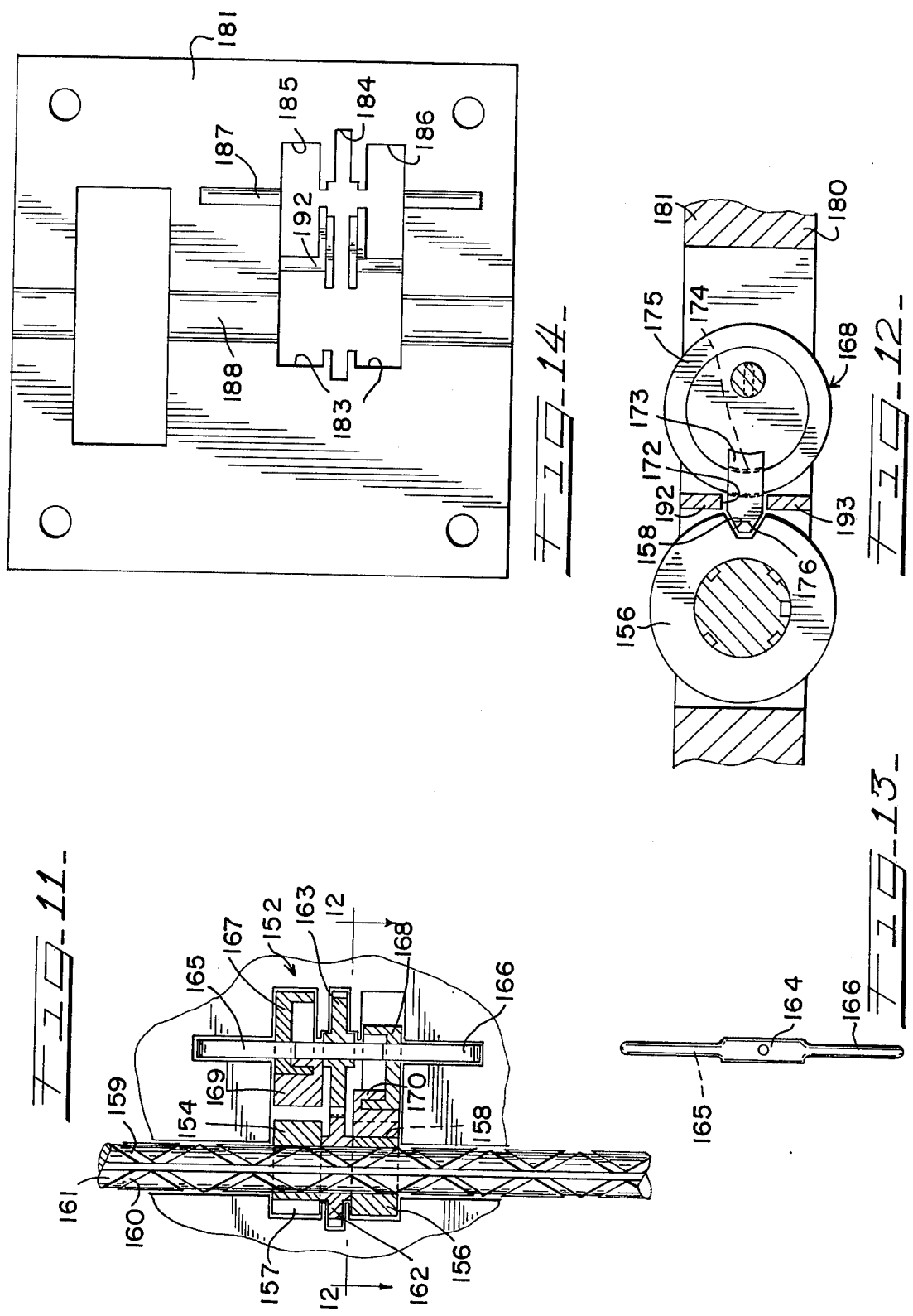

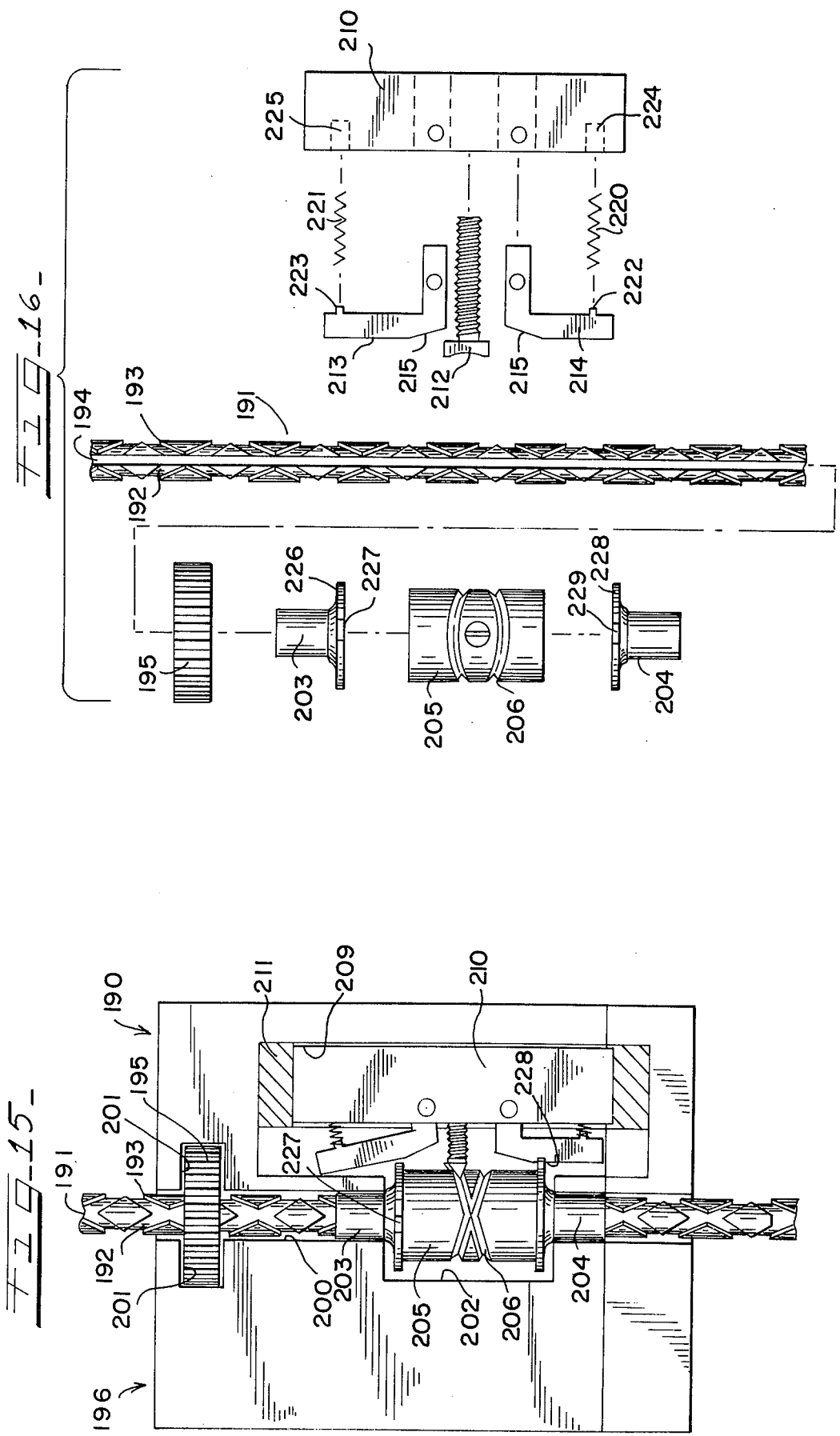

DEVICE FOR CONVERTING LINEAR MOTION TO ROTARY MOTION

The present invention relates to a device for converting linear motion to rotary motion. In particular, the present invention relates to a motion converting device where a double channel power shaft is driven linearly through directional sleeves having cams which engage one of the channels and where a locking mechanism automatically and alternately locks one of the directional sleeves against rotation so that as the power shaft is driven through the directional sleeves, the engagement of the cam with the thread causes the power shaft to rotate. A power gear is splined to the shaft so that rotation of the shaft will cause rotation of the gear for transmitting the rotary motion to a load.

In the prior art, a number of devices for converting linear motion into rotary motion have been developed. However, in most of these devices rotary motion is imparted to an output shaft by driving a cam in a direction axially of the shaft with the cam engaging in a thread or spiral groove in the output shaft. In these devices, the shaft is fixed against axial movement and is caused to rotate by moving a carrier or carriage mounting the cam along an axis parallel to the axis of the shaft. These prior art devices were somewhat bulky and were not easily adapted for use in an internal combustion engine in place of a connecting rod-crank shaft arrangement for converting linear motion of the pistons into rotary motion.

Accordingly, a general object of the present invention is the provision of a motion converting device of the type described which can be mounted in a conventional crankcase in place of a conventional crank shaft and connecting rod arrangement.

Another object of the present invention is the provision of a motion converting device in which a double channel drive shaft is driven past cams in two directional sleeves which are alternately and automatically locked against rotation and held against movement axially of the shaft.

Another object of the present invention is the provision of a device for converting linear motion to rotary motion in an internal combustion engine and in which wear of the piston and cylinder in the cylinder block is reduced by reason of the connecting rod being arranged to move linearly along the longitudinal axis of the piston and cylinder.

Another object of the present invention is the provision of a device for converting the linear motion of a piston in an internal combustion engine into rotary motion and in which eccentric forces on the main output shaft are eliminated to minimize vibration of the engine.

Still another object of the present invention is the provision of a device for converting linear motion into rotary motion which is particularly adapted for use with an internal combustion engine and in which the non-operation of one piston-cylinder unit will not place a drag on the output shaft of the motion converting device.

These and other objects of the present invention, and the manner of their attainment, will become more apparent from the following detailed description of the preferred embodiments of the invention taken in conjunction with the accompanying drawings wherein:

FIG. 1 is a side elevational view partly in section of an internal combustion engine utilizing the motion converting device of the present invention;

FIG. 2 is a vertical sectional view of the motion converting device of the present invention taken along lines 2—2 of FIG. 1;

FIG. 3 is a sectional view taken along line 3—3 of FIG. 2;

FIG. 4 is a top plan view of one of the directional sleeves shown in FIG. 2;

FIG. 5 is a fragmentary vertical sectional view taken along line 4—4 of FIG. 2;

FIG. 6 is a perspective view of the locking bar shown in FIGS. 2 and 5;

FIG. 7 is a fragmentary side elevational view of one of the bevel gears shown in FIGS. 3 and 5;

FIG. 8 is a side elevational view of a modified arrangement of the motion converting device shown in FIG. 1 with a modified guide block which receives two drive shafts and through which a unitary straight output shaft extends;

FIG. 9 is a fragmentary side elevational view of a modified locking mechanism for locking the directional sleeves shown in FIG. 2 against rotation;

FIG. 10 is a perspective view of the annular cam of the locking mechanism shown in FIG. 9;

FIG. 11 is a fragmentary perspective view of still another modified form of locking mechanism for locking the directional sleeves shown in FIG. 2 against rotation;

FIG. 12 is a fragmentary sectional view taken along line 12—12 of FIG. 11;

FIG. 13 is a vertical elevational view of the timing gear shaft shown in FIG. 11;

FIG. 14 is a side elevational view of one of the plates of the guide block for mounting the modified locking mechanism shown in FIG. 11;

FIG. 15 is a side elevational view of a modified guide block, control mechanism, and power gear with one side of the guide block removed;

FIG. 16 is an exploded view of the modified motion converting device with the guide block removed;

Figures 17, 18:
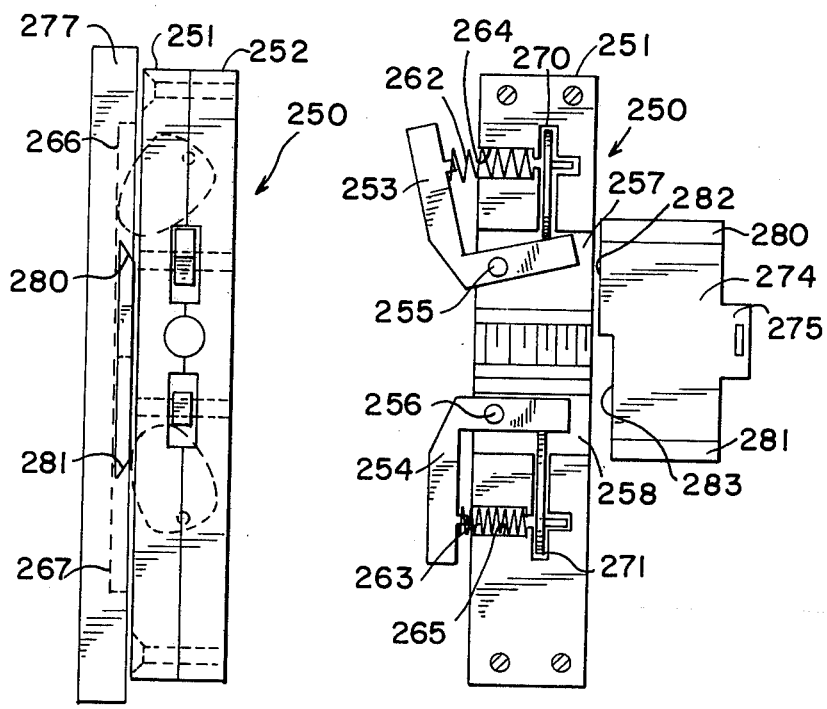
FIG. 17 is an end elevational view of a modified locking bar including a locking plate and pivoted cam lobes for disengaging both arm members from the directional sleeves.
FIG. 18 is a side elevational view of the modified locking bar apparatus shown in FIG. 17.

Referring now to the drawings in greater detail, a four cylinder internal combustion engine of known type is generally indicated at 10 in FIG. 1. The engine 10 includes a cylinder block 12 having four cylinders 14 formed therein and a casing or "pan" 15 enclosing the underside of the cylinder block 12. A piston 16 is received in each one of the cylinders 14 and is connected to one embodiment of the motion converting device of the present invention indicated at 20. Each of the devices 20 converts the linear motion of the associated piston 16 (on a power stroke thereof) into rotary motion for driving a load.

The motion converting device 20 includes a connecting rod or power shaft 22 suitably connected by a ball joint 23 to the underside of one of the pistons 16. It can be understood that any suitable means may be employed to prevent the rotation of the piston 16 in its cylinder 14. The shaft 22 drives a power gear 24 which is mounted in a guide block 26, and which operatively engages two bevel gears 27 and 28, situated on either side of the guide block 26. Each of the bevel gears 27 and 28 is mounted for rotation on an output shaft segment 30 which is supported by a depending arm 31 integral with the cylinder block 12 for rotation about an axis 32. As shown, the output shaft segment 30 at the right-hand end of the engine 10 has a flywheel 33 connected thereto which cooperates with a conventional clutch (not shown) for transmitting rotary power to a load. A gear 34 is mounted on the output shaft segment 30 at the left-hand end of the engine 10 for transmitting rotary power to auxiliary equipment (not shown) associated with the engine 10, e.g., to a valve lifting mechanism, a fuel pump, an oil pump, etc.

In one embodiment of the invention the flywheel 33 is replaced with a gear (not shown) similar to the gear 34 and the gears at each end of the engine 10 are positioned for meshing engagement with suitable gears (not shown) on a continuous straight output shaft (not shown).

Each of the guide blocks 26 is rigidly held in position below each of the cylinders 14 by a cradle or supporting framework 36 which is secured to the cylinder block 12 or to the pan 15. If desired, a splash plate 38 can be secured to the lower end of each shaft 22 for splashing oil, which settles into the pan, onto the motion converting devices 20. As best shown in FIG. 2, the double-channel shaft 22 includes two right-hand channels 40 and two left-hand channels 42, and is positioned to extend through a central bore 44 in the power gear 24 and through a bore 46 in the guide block 26. It will be noted that the power shaft 22 is arranged to move linearly and is not articulated from side to side when it moves up and down as in a conventional internal combustion engine where the connecting rod is eccentrically connected to a crank shaft.

As shown in FIGS. 2 and 3, the shaft 22 is provided with an elongated slot 48 which cooperates with a key portion 50 extending radially inwardly of the bore 44 in the power gear 24 and the slot 48 and the key portion 50 define a spline connection 51 for operatively connecting the shaft 22 to the power gear 24. The spline connection 51 permits the shaft 22 to move axially of the power gear 24 while rotatably driving the gear 24.

As shown in FIG. 2 the guide block 24 is provided with a transverse opening 52 for mounting the power gear 24 in such a way that movement of the power gear 24 axially of the rod 22 is prevented and rotation of the power gear 24 is permitted.

It will be understood that linear motion of the shaft 22 on a power stroke of the piston 16 is converted to rotary motion by driving the shaft 22 past a cam which engages in one pair of channels 40 or 42. For this purpose the motion converting device 20 includes first and second directional sleeves 54 and 56 which are mounted in appropriate openings 58 and 60 in the guide block 26 as shown in FIG. 2. Since the sleeve 56 is a mirror image of the sleeve 54 only the sleeve 54 will be described in detail with reference to FIGS. 2 and 4. As shown in FIGS. 2 and 4, the sleeve 54 has a radial projection 62 extending radially outwardly from the outer periphery of the sleeve 54 and the directional sleeve 56 is formed with a similar projection 64. Referring now to FIG. 4, the directional sleeve 54 has at least one cam 66 formed therein which received in one of the right-hand channels 40. The directional sleeve 56 has a similar cam (not shown) which is received in the left-hand channels 42. In one preferred embodiment of the invention, each of the sleeves 54 and 56 is provided with two inclined cams 66 engaging respectively in each pair of right-hand channels 40 or each of the left-hand channels 42 to balance the forces placed on the cams when the power shaft 22 is driven past the cams.

It will be understood that the sleeves 54 and 56 are free to rotate in the respective openings 58 and 60 during linear movement of the shaft 22 until the radial projection 62, 64 on one of the sleeves 54, 56 engages tang 67 extending from locking bar 68. The bar 68 is vertically movable in a slot 70 in the guide block 26 and forms part of a locking mechanism 72 for automatically and alternately locking one of the sleeves 54 or 56 against rotation. The radial projections 62 and 64 also form part of the locking mechanism 72.

As shown in FIG. 2, the tang 67 can be moved into blocking engagement with either one of the radial projections 62 and 64 to hold one of the sleeves 54 or 56 against rotation. In this way, linear movement of the shaft 22 through a locked sleeve 54 or 56 (with the cam or cams 66 therein engaging in one or both of the channels 40, 42) will convert the linear motion of the shaft 22 into rotary motion which is transmitted via the power gear 24 to a load.

In FIG. 2, the tang 67 is shown blocking the radial projection 62 on the directional sleeve 54 such that the directional sleeve 54 is locked against rotation. At this time, the directional sleeve 66 is free to rotate within the opening 60. With this arrangement, when the shaft 22 is forced downwardly on a power stroke of the piston 16, the cam 66 engaging in the right-hand channels 40 will cause the shaft 22 to rotate and this rotary motion is transmitted by the spline connection 51, the power gear 24, and the bevel gears 27 and 28 to the putput shaft segments 30.

As best shown in FIG. 6, the locking bar 68 has two arms 74 and 76 which extend respectively from each side of the bar 68 along axes which are transverse to the longitudinal axis of the locking bar 68 and parallel to the axis of rotation of the output shaft segments 30. Each one of the arms 74 and 76 is positioned in a slot 82, 84 (FIG. 5) formed in the guide block 26 for movement in a direction transverse to the axis of each arm 74 and 76 and parallel to the longitudinal axis of the locking bar 68.

As best shown in FIG. 5, each of the bevel gears 27 and 28 has a pin 86, 87 extending from one face thereof toward the guide block 26. The pin 86 is adapted to engage with the arm 74 to move the locking bar 68 downwardly whereas the pin 87 is adapted to engage the arm 76 to move the locking bar 68 upwardly. In this way, the tang 67 on the bar 68 is moved into and out of engagement with the radial projections 62 and 64. Each of the pins 86 and 87 extend in a direction parallel to the axis of rotation of the output shaft segments 36 and are located at a predetermined radial distance from the axis of the shaft segments 30. This predetermined distance is related to the pitch of the channels 40 and 42 on the shaft 22 and the length of the stroke of the piston 16 in such a way that the pin 86 engages the arm 76 when the shaft 22 has completed its downward stroke to move the tang 67 away from the radial projection 62 and into blocking engagement with the radial projection 64 on the directional sleeve 56. In this way, continued rotation of the power gear 24 will result in upward movement of the shaft 22 by reason of the engagement of the cam (within the directional sleeve 56) in the channels 42. When the shaft 22 has completed its upward stroke the pin 87 engages the arm 76 to move the tang 67 upwardly away from the radial projection 64 and into blocking engagement with the radial projection 62 to repeat the cycle of operation of the locking mechanism 72.

To hold the tang 67 of the locking bar 68 in blocking engagement with one of the projections 62, 62, the locking mechanism 72 includes a toggle spring 90 which is mounted within a recess 92 in the guide block 26. The toggle spring 90 is pivotally secured at a first end 92 to the guide block 26 and pivotally secured at a second end 94 to the locking bar 68. As shown in FIG. 2, the locking bar 68 is held against the top 95 of the slot 70 by the toggle spring 90 when the tang 67 is positioned to engage the projection 62, and is held against the bottom 96 of the slot 70 by the spring 90 when the tang 67 is positioned to engage the projection 64.

The locking mechanism 72 also includes a release member 98 which is adapted to be moved into the slot 70 to engage the bottom of the locking bar 68 and limit the downward movement thereof. In this way, the release member 98 cooperates with the spring 90 to hold the tang 67 in a nonengaging position relative to the projections 62 and 64 to deactuate the motion converting device 20. In this connection the tang 67 will be held in a position between the projections 62 and 64.

When the release member 98 is retracted from the slot 70, the locking bar will move under the action of the spring 90 to the bottom 96 of the slot 70 and in this way bring the tang 67 into blocking engagement with the projection 64 and activate the motion converting device 20.

As shown in FIGS. 1 and 3, the guide block 26 is formed by two plates 101 and 102. Although not shown in detail it will be understood that each of the plates 101 and 102 has a semi-circular groove therein and that these grooves cooperate to form the bore 46 when the plates 101, 102 are fastened together by fasteners 104. As best shown in FIG. 5, the guide block 26 has bearing plates 106 and 107 secured to opposite sides thereof for mounting suitable bearings (not shown) which support the end portions of the output shaft segments 30 mounting the bevel gears 27 and 28, respectively.

In FIG. 8 a modified form of the motion converting device is generally indicated at 110. The motion converting device 110 is adapted for use with an internal combustion engine (not shown) which has a unitary straight output shaft 111.

As shown, the device 110 includes two shafts 113, each having a right-hand channel 114 and a left-hand channel 115, and each of which is received through a power gear 116. Also, each of the rods 113 has alongitudinal slot 117 forming part of a spline connection with the power gear 116 similar to the spline connection 51 shown in FIG. 2. The power gears 116 are mounted in an opening 118 in a modified guide block 119 and drive (or are driven by) an intermediate bevel gear 120 mounted on a stub shaft 121. The intermediate gear 120 is in continuous meshing engagement with a bevel gear 122 which is suitably secured to the main shaft 111. The rods 113 are positioned for linear movement along parallel axes on either side of the axis 112 of the output shaft 111. With this arrangement, the output shaft 111 is straight and continuous as opposed to the output shaft segments 30 in the embodiment shown in FIG. 1.

Each of the rods 113 has two directional sleeves 123 and 124 associated therewith. These sleeves 123 and 124 are essentially the same as the sleeves 54 and 56 shown in FIG. 2 and have cams (not shown) which engage in one or the other of the threads 114 and 115. A locking mechanism for automatically and alternately locking one of the sleeves 123 or 124 against rotation is generally indicated at 126. This locking mechanism 126 can take several forms, one of which will be described with reference to the description of FIGS. 9 and 10.

As shown in FIG. 9, the locking mechanism 126 includes a locking bar 128, radial projections 132 and 134 extending from the respective directional sleeves 122 and 124, and an annular cam 136. The locking bar 128 has first and second tang 138 and 140. The tang 138 is adapted to be moved into and out of blocking engagement with the radial projection 132 whereas the tang 140 is adapted to be moved into and out of blocking engagement with the projection 134. The annular cam has a width which is essentially equal to the distance between the tang 138 and 140, and the outer periphery of the cam 136 is positioned between the tang 138 and 140. As shown in FIG. 10, the cam 136 has a central bore 142 through which the shaft 113 extends. The cam 136 also has a key portion 144 which extends into the bore 142 and which is adapted to be received in the longitudinal slot 117 to form a spline connection with the shaft 113. Although not shown in detail, it is to be understood that the cam 136 is received in an opening 146 formed in the guide block 119 and held therein against movement axially of the rod 113. As best shown in FIG. 10, the outer periphery portion of the annular cam 136 includes first and second offset locating sections 147 and 148.

It will be understood that rotation of the shaft 113 will cause rotation of the outer peripheral portion of the annular cam 136 between the tangs 138 and 140. As the cam 136 rotates in the opening 146, the sections 147 and 148 are alternately positioned between the tangs 138 and 140. Since the sections 147 and 148 are offset from one another, the locating sections 147 and 148 will alternately move the locking bar 128 upwardly and downwardly to alternately and independently position the tang 138 in blocking engagement with the radial projection 132 and the tang 140 in blocking engagement with the radial projection 134.

In this embodiment, the pitch of the threads 114 and 115 is related to the length of the stroke of the power shaft 113 in such a way that the directional sleeve 123 will be locked against rotation during the downward stroke of the shaft 113, and at the end of the downward stroke, the cam 136 will move the tang 138 away from the projection 132 to unlock the sleeve 122 and move the tang 140 into engagement with the projection 134 to lock the sleeve 124 against rotation to cause upward movement of the shaft 113. Then, after the shaft 113 has completed its upward stroke, the locating section 148 will be moved between the tangs 138 and 140 moving the tang 140 away from the projection 136 to unlock the sleeve 124 and moving the tang 138 into engagement with the projection 134 to again lock the sleeve 122 to repeat the cycle of operation of the locking mechanism 126.

Another form of locking mechanism for alternately and automatically locking one of the directional sleeves (such as the sleeves 54 and 56 shown in FIG. 1) against rotation is generally indicated at 152 in FIG. 11. In this embodiment, the directional sleeves 154 and 156 each has a recess or slot 157, 158 formed therein. As in the previous embodiments, each of the directional sleeves 154 and 156 has at least one cam — preferably two cams — (not shown) therein which engage in one of the right-hand channels 159 or one of the left-hand channels 160 formed in the shaft 161.

The locking mechanism 152 includes a spur gear 162 which has a spline connection with the shaft 161 so that the spur gear 162 is rotated when the shaft 161 rotates. A timing gear 163, is positioned for meshing engagement with the spur gear 162 and is mounted on a timing gear shaft 164. As shown in FIG. 13, the timing gear shaft 164 has upper and lower flat portions 165 and 166 which are received respectively in slots formed in upper and lower cup-shaped cam actuators 167 and 168. As shown in FIGS. 11 and 12, the slots in the cam actuators 167 and 168 are offset from the axis at the cup-shaped cam actuators so that rotation of the timing gear shaft 164 will cause eccentric rotation of the cam actuators 167 and 168. As shown in FIG. 11, the cam actuators 167 and 168 are mounted on the timing gear shaft 164 in such a way that the cam actuator 167 extends away from the directional sleeve 154 when the cam actuator 168 extends toward the sleeve 156.

Each of the cam actuators 167 and 168 has a cam 169, 170 connected thereto. Since the cam 170 is identical to the cam 169, only the cam 170 will be described in detail with reference to FIG. 12. As shown in FIG. 12, the cam 170 is received in a guideway 171 formed in a guide block 172 similar to guide block 26. The cam 170 has a first end portion 173 which has a slot 174 formed therein. The rim portion 175 of the cam actuator 168 is received in the slot 174. The cam 170 also has a second end portion 176 which is positioned for movement into and out of the recess 158. The cam 169 is formed in like manner and secured to the cam actuator 167.

As shown in FIG. 12, the guide block 172 is formed from two plates 180 and 181, and the plate 181 is shown in FIG. 14. Referring now to FIG. 14, the plate 181 is formed with suitable openings 183 for receiving the directional sleeve 154 and 156 and openings 184, 185 and 186 for receiving respectively the timing gear 163 and the cam actuators 167 and 168. The plate 181 also has a semi-circular groove 187 which forms part of a bore for receiving the timing gear shaft 165 and a semi-circular groove 188 which defines part of a bore which receives the shaft 161. The plate 181 also has a portion 192 which cooperates with a similarly formed portion 193 (FIG. 12) in the plate 180 to define the guideway 171.

It will be understood that engagement of the cams 169 or 170 within one of the directional sleeves 154 or 156, in one of the right-hand channels 159 or one of the left-hand channels 160, will cause rotation of the shaft 161 as it moves downwardly on a power stroke of the piston (not shown) connected thereto. This rotation of the shaft 161 will rotate the spur gear 162 and the timing gear 163 to cause rotation of the timing gear shaft 164. As a result, the eccentrically mounted cam actuators 167, 168 are rotated about the axis of the timing gear shaft 164 to cause movement of the cam 169, into the recesses 157, in the sleeve 154, and the other cam 170, out of the recess 158, in the sleeve 156. At the end of the power stroke of the shaft 161, the cam 169 will have been moved out of the recess 157, leaving the sleeve 154 free to rotate, and the cam 170 will have been moved into the recess 158 to lock the sleeve 156 against rotation and initiate upward movement of the shaft 161.

It will be understood that the ratio of the gears 162 and 163 and the pitch of the threads 159 and 160 are related to the stroke of the shaft 161 in such a way that the cam 169 will lock the sleeve 154 against rotation during the power stroke of the shaft 161 and the cam 170 will lock the sleeve 156 against rotatiton during the return stroke of the rod 161. Also, the locking mechanism 152 will unlock the locked sleeve 154 or 156 at the end of each stroke of the rod 161.

A further form of the mechanism is shown in FIGS. 15 and 16 generally at 190. The shaft 191 has right and left hand spiral means 192, 193, respectively, and a spline 194 located thereon. A power takeoff gear 195 is splined to the shaft 191 so that it turns with it. It should be noted that the power takeoff gear 195 may be a bevel, spur, or other type of gear without depreciating from the scope of the invention.

Shaft 191 and power gear 195 mounted thereon and splined thereto are retained in position by guide block 196. The guide block is split into two portions (not shown) as described in other embodiments and has a central round aperture 200 therethrough. The diameter of aperture 200 is larger than the diameter of shaft 191 which runs lengthwise therethrough. Opening 201 located through the width of guide block 196 and across aperture 200 forms a mounting restraint for power gear 195 preventing its axial movement as the shaft 191 moves axially relative the gear. A second T-shaped opening 202 extends through the width of guide block 196. Aperture 200 is in communication with opening 202 through the base of the T. The T-shape opening 202 along with aperture 200 forms a receptacle and mounting for directional sleeves 203, 204 and annular cam 205. Both directional sleeves 203, 204 and annular cam 205 have holes through their centers in which shaft 191 is mounted. Directional sleeves 203, 204 have right and left-hand spiral engaging cams respectively located in their central holes for engaging the respective spirals of shaft 191. Annular cam 205 is splined along shaft 191 in between directional sleeves 203 and 204. Annular cam 205 includes a groove 206 formed on its outside surface so as to produce one cyclical movement laterally for every two rotations of said annular cam.

A locking bar 210 is slidably received in a pocket 211 adjacent T-shaped opening 202. Locking bar 210 is movable laterally in a direction parallel to the axial rod movement and it includes a cam follower 212 which fits in the annular cam groove 206 and determines the lateral movement of locking bar 210 as the annular cam 205 turns with shaft 191. Locking bar 210 also includes two L-shaped arm members 213 and 214 each pivotally mounted through its shorter side to locking bar 210. Each L-shaped arm member 213 and 214 has a diagonal flat side 215, 216, respectively, at the outside juncture of the two legs of the L. Springs 220, 221 resiliently extend the longer legs of L-shaped arm members 213, 214, respectively, and are retained at notches 222, 223 and recesses 224, 225, respectively, in locking bar 210.

In operation, arms 213, 214 are resiliently extended alternately against flange portions 226, 228 of directional sleeves 203, 204, respectively, as locking bar 210 is moved laterally by annular cam 205. The directional sleeves, cam and locking bar apparatus serve as a control means which assures the rotation of shaft 191 in one direction and reverses axial movements of the shaft. As shaft 191 is moved axially by external means, one of the two directional sleeves 203, 204 is alternately held stationary at its flange notch by its respective adjacent locking bar arm member 213, 214 engaged therewith. The stationary directional sleeve then forces shaft 191 to turn in one direction, the arm member then slides laterally in the notch as the cam follower 212 and the locking bar is moved laterally by the rotating cam groove 206. As the cam follower 212 approaches the directional sleeve which is held stationary, the diagonal side 215, 216 at the end of the respective arm member engaged in the notch causes the directional sleeve to become disengaged from the arm member. As one arm member and directional sleeve, for example, sleeve 203, and arm member 213 are disengaging, arm 214 is pressing against flange 228. As notch 229 rotates, it comes into engagement with arm 214, stopping the rotation of directional sleeve 204. The disengagement of directional sleeve 203 having a left-hand spiral engaging means and the engagement of directional sleeve 204 having a right-hand spiral means together with the directional turning inertia of shaft 191 causes the shaft to continue rotation in the same direction while reversing its direction of reciprocal movement. The cause-effect relationship of the mechanism may be varied so that either reciprocating motion may be controlled by the control mechanism to drive the power gear in one direction or the power gear may drive the shaft in one direction while the locking mechanism controls it reciprocation.

Another modification of the locking bar mechanism is shown in FIGS. 17 and 18 and generally designated at 250. The locking bar mechanism 250 may be movably mounted in a suitable guide block such as that at 196. A two-piece split locking bar 251, 252 is utilized to mount the other working parts of the mechanism. As shown in FIG. 18, the mechanism includes L-shaped arm members 253 and 254 pivotally mounted at 255 and 256 in locking bar recesses 257 and 258, respectively. L-shaped arm members 253, 254 are similar to those peviously described at 213, 214 in FIG. 16 in that they are L-shaped, pivotally retained in the locking bar, and maintained in a position extending from the locking bar and biased outwardly therefrom by springs 262, 263, respectively, which are mounted in locking bar recesses 264 and 265. Locking lobe cams 270, 271 received in their respective locking bar cam mounting recesses 272 and 273 are pivotally mounted in this embodiment at the bottom of spring mounting recesses 264, 265. Pivoting cam lobes 270, 271 are movable in and out of engagement with L-shaped arm members 253, 254, respectively, as they move along recessed slots 266, 267 located in guide block 277 be a cam lobe engaging plate 274 also in guide block 277 which is connected to external control means (not shown) at 275. The lobe engaging plate 274 slides in recess 276 of the guide block. In this embodiment, the beveled cam lobe engaging edges 280, 281 located at the side margins of lobe engaging plate 274 push the cam lobes into restraining engagement with L-shaped arm members 253, 254, thereby locking the arm members in a position disengaged from the control sleeves 203, 204 shown in FIGS. 15 and 16. The leading edges 282, 283 of lobe engaging plate 274 are not colinear but are located in spaced relation to each other a distance D apart such that L-shaped arm member 253 will be locked out of engagement with rotating sleeve 203 first. This allows the locking bar mechanism 250 to move laterally in the guide block 196 so L-shaped arm member 254 will be disengaged from rotating sleeve 204 when the leading edge 283 or plate 274 forces cam lobe 271 to engage arm member 254 locking out the member. Reversing the movement of the lobe engaging plate 274 causes the cam lobes 270, 271 to disengage from their respective L-shaped arm members 253, 254, thus allowing the members to engage their respective adjacent directional sleeves for controlling the movement of the shaft 191. In FIG. 18 the cam lobes 270, 271 are shown in different positions for explanation purposes only. In the operation of this embodiment, lobe 271 will engage arm 254 only after lobe 270 has engaged arm 253.

While the mechanism of the invention has been shown for use primarily in an automobile engine, it should be noted that it may be utilized for reciprocating any rotating shaft or for rotating any reciprocating shaft in one direction as it reciprocates.

It will be understood that variations may be effected without departing from the scope of the novel concepts of the present invention, but it is understood that this application is to be limited only by the scope of the appended claims.

I claim:

1. A device for converting linear motion to rotary motion, said device comprising a double channel drive shaft having a right-hand channel and a left-hand channel, one end of said shaft being connected to means for cyclically imparting linear movement of said shaft and having a central bore through which said shaft is received, fixedly mounted housing means in which said shaft is axially slidably mounted and in which said gear is rotatably mounted and restrained from a spline connection between said shaft and said gear operatively connecting said shaft to said gear and permitting said shaft to move axially of said power gear, first and second directional sleeves spaced axially from said gear and adapted to receive said shaft therethrough, each of said directional sleeves having at least one cam therein positioned to engage one of said channels, said sleeves being rotatably mounted in said housing means while being restrained against axial movement therein, and means operable during each cycle of linear movement of said shaft for automatically locking said first sleeve against rotation during a stroke of linear movement of said shaft in a first direction to thereby cause rotation of said shaft in one direction and for automatically unlocking said first sleeve and then locking said second sleeve against rotation at the end of said stroke so that, upon a reverse stroke of linear movement of said shaft in the opposite direction, said gear will continue to rotate in said one direction, or upon continued rotation of said gear in said one direction, said shaft will be driven in the opposite linear direction until said shaft completes its stroke in said opposite direction at which time said automatic locking means will unlock said second sleeve and lock said first sleeve to repeat the cycle of operation of said automatic locking means.

2. A motion converting device as defined in Claim 1 wherein said device includes two bevel gears positioned on opposite sides of said drive shaft in meshing engagement with said power gear, said bevel gears being mounted for rotation about an axis transverse to the axis of said shaft and said means to automatically and alternately locking one of said first and second sleeves against rotation includes a radial projection extending from each of said sleeves, a locking bar having a tang adapted to alternately engage one of said radial projections, said locking bar being positioned for linear reciprocal movement along an axis parallel to said axis of said drive shaft and having two arms extending outwardly therefrom in opposite directions, each along an axis which is parallel to said axis of rotation of said bevel gears, and a pin extending from a side surface of each one of said bevel gears in a direction toward said drive shaft, each of said pins being adapted to alternatively engage one of said arms on said locking bar during rotation of said power gear to move said tang on said locking bar our of engagement with one of said radial projections and into engagement with the other of said radial projections, the radial distance of each of said pins from said axis of rotation of said bevel gears and the ratio of said bevel gears to said power gear being related to the length of said stroke of said power shaft.

3. A motion converting device as defined in claim 2 including means for moving said locking bar to a disengaged position where said tang does not engage either of said projections and means for holding said locking bar in said disengaged position.

4. A motion converting device as defined in claim 1 wherein said means for automatically and alternatively locking one of said directional sleeves against rotation includes a radial projection extending from each of said sleeves, a locking bar positioned for movement along an axis parallel to the axis of said power shaft and having first and second circular cam actuators eccentrically mounted on said timing shaft, first and second cams mounted in respective guideways which extend between said axes of said shafts, each of said cams having a first end portion which is adapted to be received in one of said recesses in one of said sleeves for holding said sleeve against rotation and having a second end portion which is coupled to the periphery of one of said circular cam actuators in such a way that rotation of said circular cam actuator about its eccentric axis on said timing shaft will cause movement of said cam in said guideway toward and away from one of said sleeves to move said first portion into and out of said recess in said sleeve for locking and unlocking said sleeve against rotation, and the ratio of said spur gear to said timing gear being related to the pitch of said threads and the length of said stroke of said drive shaft.

5. A motion converting device as defined in claim 1 wherein said means for automatically and alternatively locking one of said directional sleeves against rotation includes a recess in the periphery of each one of said directional sleeves, a spur gear positioned between said directional sleeves and having a spline connection with said shaft whereby rotation of said shaft will rotate said spur gear and whereby said shaft is permitted to move axially of said spur gear, a timing gear in meshing engagement with said spur gear and fixed on a timing shaft having an axis of rotation parallel to the axis of said drive shaft, first and second circular cam actuators eccentrically mounted on said timing shaft, first and second cams mounted in respective guideways which extend between said axes of said shafts, each of said cams having a first end portion which is adapted to be received in one of said recesses in one of said sleeves for holding said sleeve against rotation and having a second end portion which is coupled to the periphery of one of said circular cam actuators in such a way that rotation of said circular cam actuator about its eccentric axis on said timing shaft will cause movement of said cam in said guideway toward and away from one of said sleeves to move said first portion into and out of said recess in said sleeve for locking and unlocking said sleeve against rotation, and the ratio of said spur gear to said timing gear being related to the pitch of said threads and the length of said stroke of said drive shaft.

6. A motion converting device as defined in claim 1 wherein said housing means includes a guide block which has openings for receiving and mounting said power gear, said first and second directional sleeves and said means for automatically and alternately locking one of said directional sleeves against rotation, said guide block also having a bore for receiving said drive shaft.

7. A motion converting device as defined in claim 1 wherein said means for imparting linear motion to said drive shaft comprises a piston movable in a cylinder, and said device includes two bevel gears positioned respectively on opposite sides of said drive shaft for meshing engagement with said power gear, each of said bevel gears being mounted on an output shaft segment for rotation about an axis which intersects the axis of said drive shaft, and means for transmitting rotary power from said output shaft segments to a load.

8. A motion converting device as defined in claim 1 wherein said drive shaft has two right-hand channels and to left-hand channels, and each of said directional sleeves has two cams therein, each cam being adapted to engage in one of said two right-hand channels or one of said two left-hand channels.

9. A motion converting device as defined in claim 1 wherein said means for automatically and alternatively locking one of said directional sleeves against rotation includes a recess in the periphery of each one of said sleeves, a locking bar positioned for movement along an axis parallel to the axis of said drive shaft and having first and second arms resiliently extending therefrom which are adapted to alternately engage one of said recesses on one of said directional sleeves and being operatively connected to said shaft by a spline connection which permits said shaft to move axially of said cam whereby said cam is rotated when said drive shaft is rotated, and means for holding said cam against movement axially of said shaft, said cam having an outer peripheral portion which engages a cam follower on said locking bar positioned between said arms, the rotation of said peripheral portion moving said locking bar and cam follower in an axial cycle which alternately positions one of said arms in engagement with one of said directional sleeve recesses, and the pitch of said threads and shape of said cam peripheral portion being related to the length of said stroke of said drive shaft.

10. A motion converting device as defined in claim 9 further comprising means for retaining said first and second arms in a retracted position preventing their engagement with either of said directional sleeves.

11. In an internal combustion engine having a plurality of pistons received in a cylinder block, the combination of a device connected to each piston for converting the linear motion of a power stroke of each piston into rotary motion, each of said devices including a double channel connecting shaft having two right-hand channels and two left-hand channels, one end of each rod being connected to one of said pistons, a guide block mounted in fixed relation to said cylinder block of said engine, each of said guide blocks having a bore through which one of said connecting shafts extends, a power gear mounted in said guide block in the path of movement of said shaft and having a central bore through which said shaft is received, said guide block holding said power gear against movement axially of said shaft and permitting said power gear to rotate, a spline connection between said shaft and said power gear operatively connecting said shaft to said power gear for rotatably driving said power gear and permitting said shaft to move axially of said power gear, first and second directional sleeves mounted in said guide block at positions spaced axially from said power gear and adapted to receive said shaft therethrough, each of said first and second directional sleeves having two cams therein, each one of said cams in one of said sleeves being adapted to engage in one of said two right-hand channels or one of said left-hand channels, said guide block holding said sleeves against axial movement, and means for automatically locking said first sleeve against rotation during said power stroke of said piston in one direction to thereby cause rotation of said shaft in one direction and for automatically unlocking said second sleeve against rotation at the end of said power stroke to initiate a return stroke of said shaft in the opposite direction and also holding said second sleeve locked against rotation until said shaft completes its stroke in said opposite direction at which time said automatic locking means will unlock said second sleeve and then lock said first sleeve to repeat the cycle of operation of said locking mechanism, two bevel gears supported by said guide block on opposite sides of said shaft for rotation about an axis intersecting said shaft, each of said bevel gears being positioned in meshing engagement with said power gear and being mounted on output shaft segments, and a power take-off means connected to the output shaft segment at one end of said internal combustion engine.

12. In the internal combustion engine as defined in Claim 11, means for disengaging said automatic locking means from said first and second sleeves whereby both first and second sleeves are free to rotate at the same time.

* * * * *

UNITED STATES PATENT AND TRADEMARK OFFICE
CERTIFICATE OF CORRECTION

PATENT NO. : 3,952,604
DATED : April 27, 1976
INVENTOR(S) : James P. Baudler

It is certified that error appears in the above-identified patent and that said Letters Patent are hereby corrected as shown below:

```
Col.  3, line 64, after "which" insert --is--;
Col.  5, line 23, change "downwward" to --downward--;
         lines 56 and 57, change "alongitudinal" to
                          --a longitudinal--;
Col.  6, line 35, change "periphery" to --peripheral--;
Col.  7, line 20, change "at" to --of--;
Col.  9, line 57, change "be" to --by--;
Col. 10, line  7, change "or" to --of--;
Col. 11, line 16, change "our" to --out--;
Col. 12, line 31, change "to" to --two--.
```

Signed and Sealed this

Thirty-first Day of August 1976

[SEAL]

Attest:

RUTH C. MASON
*Attesting Officer*

C. MARSHALL DANN
*Commissioner of Patents and Trademarks*